(12) United States Patent
Allen, IV (10) Patent No.: US 8,226,390 B2
(45) Date of Patent: Jul. 24, 2012

(54) FLEXIBLE SHUTOFF INSERT MOLDING DEVICE

(75) Inventor: James D. Allen, IV, Broomfield, CO (US)

(73) Assignee: TYCO Healthcare Group LP, Mansfield, MA (US)

( * ) Notice: Subject to any disclaimer, the term of this patent is extended or adjusted under 35 U.S.C. 154(b) by 171 days.

(21) Appl. No.: 12/555,979

(22) Filed: Sep. 9, 2009

(65) Prior Publication Data

US 2011/0057353 A1    Mar. 10, 2011

(51) Int. Cl.
*B29C 45/14* (2006.01)
(52) U.S. Cl. ...... 425/127; 425/577; 264/275; 264/328.9
(58) Field of Classification Search .................. None
See application file for complete search history.

(56) References Cited

U.S. PATENT DOCUMENTS

| 4,236,689 | A | * | 12/1980 | Hass | 249/204 |
| 4,584,155 | A | * | 4/1986 | Zanella | 264/252 |
| 5,061,429 | A | * | 10/1991 | Yoshihara et al. | 264/252 |
| 5,108,687 | A | * | 4/1992 | Jourquin et al. | 264/279 |
| 5,118,271 | A | * | 6/1992 | Baird et al. | 425/116 |
| 6,019,588 | A | * | 2/2000 | Peters et al. | 425/125 |
| 6,939,504 | B2 | | 9/2005 | Homann et al. | |
| 7,510,677 | B2 | | 3/2009 | Miller et al. | |

* cited by examiner

Primary Examiner — Edmund H. Lee (57) ABSTRACT

Method and device for sealing an insert in a molded part to avoid the escape of flash, the device includes an upper mold and a lower mold halves that mate together to define a cavity configured to receive the insert. A compressible material is coupled to the lower mold half to facilitate engagement of the inserted workpiece. The lower mold half has a slide, operated by a cam pin in the upper mold half when the upper and lower mold halves mate together. The upper mold half includes an upper plunger having first and second surfaces and a spring is coupled to the mating surface of the upper mold half. The spring compresses the compressible material and engages the inserted workpiece to form a flash barrier along the molding chamber.

9 Claims, 8 Drawing Sheets

FIG. 12

FLEXIBLE SHUTOFF INSERT MOLDING DEVICE

BACKGROUND

1. Technical Field

The present disclosure relates to a mold for insert molding. More particularly, the present disclosure relates to a molding device and process having components to accommodate size variation of an insert while preventing flashes from escaping from the cavity at the insert location.

2. Background

Insert molding by an injection molding method has been widely used in the prior art, which an insert component is covered with resinous material in conformity with the contour of the former. Generally, in the injection molding method, an insert component is located and fixed at a predetermined position within a cavity of a mold made, for example, of metal and is clamped in this state. Then, molten resin injected from a nozzle of a molding machine is filled in the cavity via a sprue, a runner and a gate to cover the outer circumference of the insert component in conformity with the cavity-forming surface, thus forming the insert-mold product.

In producing plastic parts having metal inserts such as a member of an end effector assembly, a very tight fit of the insert in the cavity is desired so that flash (excess plastic) cannot escape. Flash around the insert is cosmetically undesirable, and the flash may also interfere with subsequent assembly operations involving the part. One solution is to allow the flash to be produced, but to then remove that flash in a subsequent operation. However, labor costs involved in removing the flash are proportionately exorbitant. The best solution is to avoid the production of the flash during the process. In the prior art, the most common method of avoiding the production of flash has been to machine the insert opening in the cavity to very close tolerances (e.g., plus or minus 0.001 inch). Even so, flash frequently escapes due to the ordinary production tolerances found in the inserts themselves. Additionally, such molds can be expensive to manufacture. Moreover, variations in insert sizes may cause manufacturing defects. For example, if an insert is too small, flashes occur at shutoff. If an insert is too large, the clamp pressure of the tool may crush the insert and/or damage the mold tool.

SUMMARY

The present disclosure relates to an insert molding device. The device includes an upper mold half and a lower mold half having mating surfaces that mate together to define a cavity configured to receive an inserted workpiece therein. A portion of the cavity is enlarged to provide a molding chamber surrounding a region of the inserted workpiece. The device further includes a compressible material overlaying one of the mold halves' mating surfaces to facilitate engagement of the inserted workpiece. An injection gate includes an outlet defined therein opening into the molding chamber to deliver molten plastic under pressure into the molding chamber for molding the molten plastic on the inserted workpiece. The upper mold half includes a first piece and a second piece each having first and second surfaces. A spring is disposed in between the first surface of the first piece to the second surface of the second piece. The spring is configured to compress the compressible material and engage the inserted workpiece and to form a flash barrier along the molding chamber.

In another embodiment, a method for covering a portion of a workpiece with a plastic material is disclosed. The method includes engaging surfaces of an upper mold half and a lower mold half for defining a cavity to receive an inserted workpiece therein. A portion of the cavity is enlarged for providing a molding chamber surrounding a region of the inserted workpiece. The method further includes coupling a compressible material to one of the mold halves surfaces for facilitating engagement of the inserted workpiece. Additionally, the method includes delivering molten plastic under pressure into the molding chamber for molding the molten plastic on the inserted workpiece. The upper mold half includes a first piece and a second piece each having first and second surfaces. A spring is coupled to a first surface of the first piece to a second surface of the second piece to compress the compressible material and engage the inserted workpiece and to form a flash barrier along the molding chamber.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Injection molding is the major process responsible for the mass production of thin-shelled plastic parts with three dimensional complex shapes. The injection molding operation is capable of producing large quantities of intricate parts at relatively low cost. The injection molding process begins with the plastic material itself in the form of pellets, grind, or powders. The plastic is fed through a funnel shaped hopper into a high pressure and high temperature screw pump. The plastic must be changed from a solid to a melt and then injected into a mold. Depending on the material and its viscosity, melting temperatures can range from 275 to 500° F. After the plastic is melted, it must be thoroughly mixed to insure a uniform temperature throughout the melt. When the plastic reaches the right homogeneous viscosity and temperature, it is injected, under high pressure, into a steel mold. The pressures range from 10,000 to 30,000 pounds per square inch (PSI). To withstand this pressure, molds are made out of the highest quality steel and the cavity surfaces are hardened. The plastic materials are then held in the mold until the melted plastic cools to a solid condition. Once cooled, the mold opens and the molded plastic part is ejected. The entire process of closing the mold, injecting the plastic, cooling, and ejecting the solid part is called the injection molding cycle. In general, the injection molding cycle includes three steps.

The first step is injection of the melted plastic, which includes heating and melting the plastic material, mixing the melt with additives, homogenizing the melt to a uniform temperature, and injecting the melt into the mold cavity. The second step is holding the mold closed until the material cools. Finally in the third step, the mold is opened and the part is ejected. As noted above, a common problem with insert molding by injection molding is the creation of flash. Flash is any excess material that is formed with and attached to the component along a seam or mold part line. An extra finishing operation is usually required to remove the flash material.

A perhaps even more important, but sometimes less well understood problem is that flash or leakage of plastic from the molding cavity is sometimes indicative of problems that may create poorly finished products. The part (or parts) of the mold serve to define the out boundaries of the plastic metal interface are often referred to as "flash barriers". Because plastic curing is an exothermic reaction and one that creates gases and like reaction products, if the plastic is not maintained in a closely confined, high pressure environment until the cursing cycle is complete, the resulting product will be porous and improperly finished. However, if conditions of excess pressure exist, the plastic may be forced to leak or "flash" from the mold.

Figure 1:
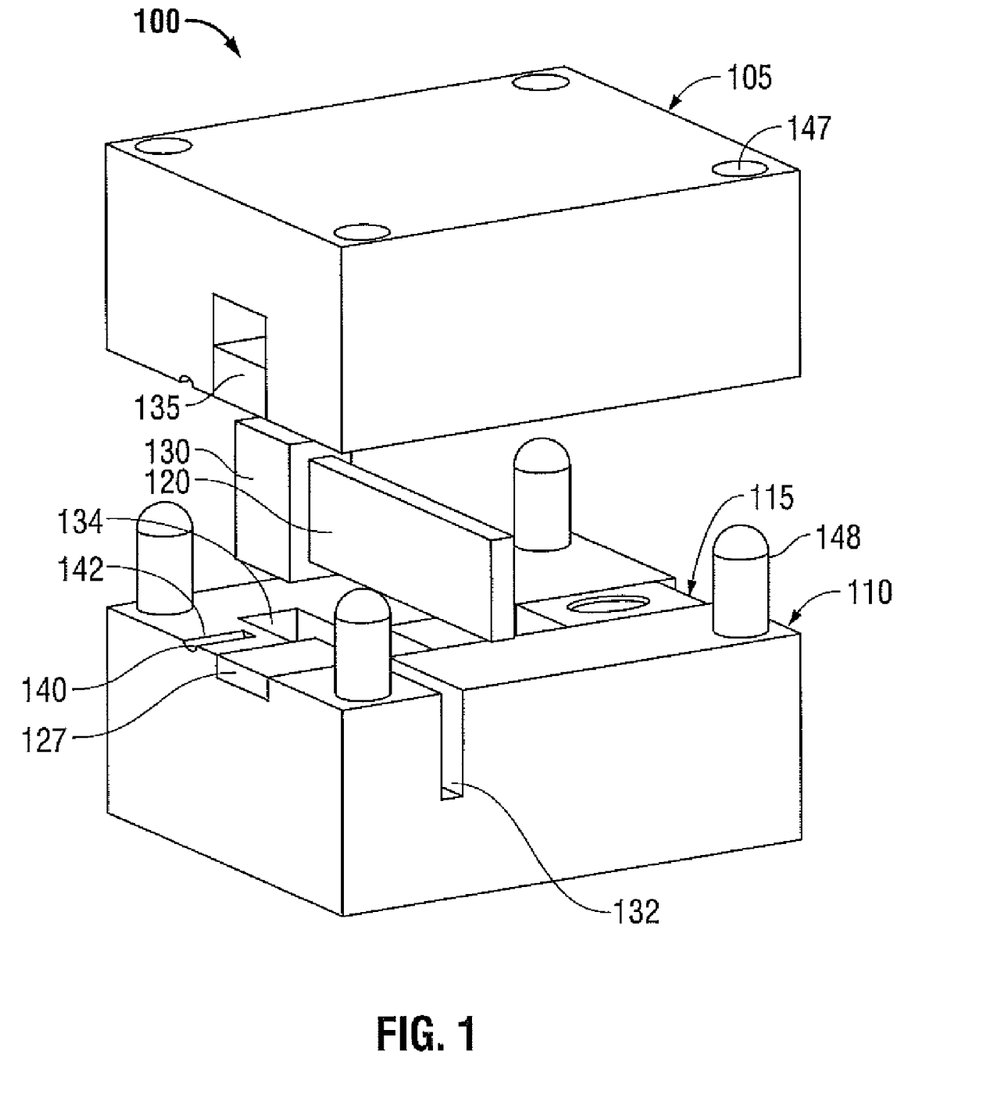
FIG. 1 is an isometric view of an insert in a mold according to an embodiment of the present disclosure.

As will be further described below in detail, an insert molding device and method are disclosed to prevent the creation of flash while maintaining a tight seal in the mold. FIG. 1 shows a mold used for preparing an overmolded jaw member of an end effector assembly for use with an electrosurgical instrument. While the present disclosure is particularly suitable for use with the manufacture of jaw members, it is also applicable to other medical and non-medical devices that require an overmolded component.

Figure 2:
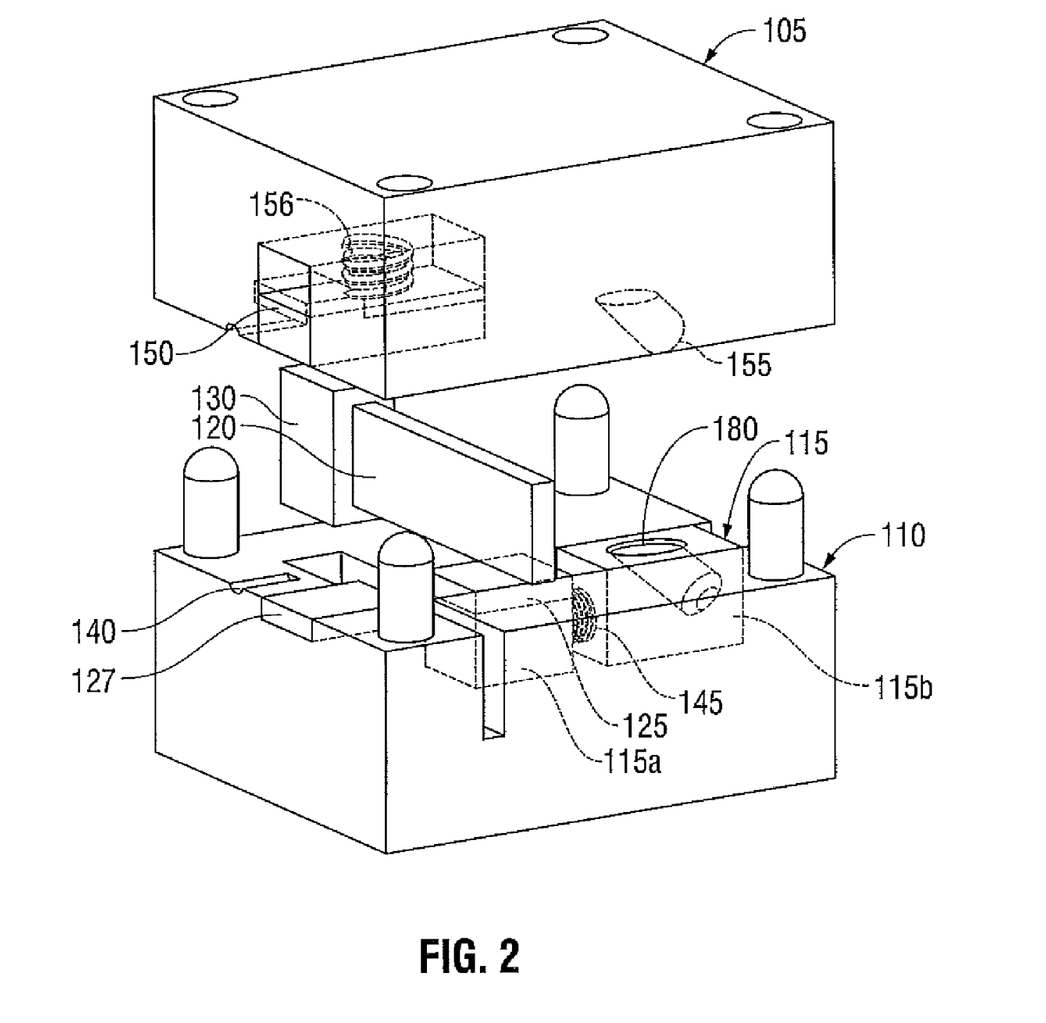
FIG. 2 is an internal, isometric view of the inset and mold of FIG. 1 according to an embodiment of the present disclosure.

Referring now to the drawings in greater detail, FIGS. 1 and 2 show an insert molding device 100. The molding device 100 molds an inserted workpiece 120 with an overmold 130 of plastic material at an end of the inserted workpiece 120 (e.g., a jaw member). The insert molding device 100 includes an upper mold half 105 and a lower mold half 110. The upper 105 and lower 110 mold halves have mating surfaces that mate together to form a cavity 132 configured to receive the inserted workpiece 120 therein. A portion of the cavity 132 is enlarged to provide a molding chamber 134 surrounding a region of the inserted workpiece 120. Runner system 142 conveys the molten material from a sprue (not shown) to an injection gate 140. The injection gate 140 has an outlet opening 141 (FIG. 3) into the molding chamber 134 for molding a plastic covering on the inserted workpiece 120. A section of the runner system 142 may have maximal cross-sectional area and minimal perimeter. Runner system 142 may also have a high volume-to-surface area ratio to minimize heat loss, premature solidification of the molten resin in the runner system 142, and pressure drop.

The lower mold half 110 includes a slideable plunger 115 configured to slide horizontal along the lower mold half 110 between a mating position and non-mating position. The mating position is when the mold halves 105, 110 close together and are ready for the molten material to enter the molding chamber 134. In contrast, the non-mating position is when the mold halves 105, 110 open up. The slideable plunger 115 includes a first and second slide plunger 115A, 115B, respectively, and a spring 145 interposed therebetween. The slideable plunger 115 is resiliently urged into a closed position when the upper mold half 105 comes together with the lower mold half 110 and cam pin 155 acts on angled hole or opening 180 in the second slide plunger 115B. The first slide plunger 115A moves to a position against the inserted workpiece 120. The spring 145 allows the second slide plunger 115B to move to a fixed closed position in the lower mold half 110, and the first slide plunger 115A is allowed to rest at a position tightly against the inserted workpiece 120. This mechanism accommodates variations in size of the inserted workpiece 120 in the thickness direction (width).

A compressible material 125 is mated to a top surface of the first slideable plunger 115A. Another compressible material 127 is also mated to a mating surface of the lower mold half 110. When the upper mold half 105 closes onto the lower mold half 110, the upper plunger 135 moves tightly against the top of the inserted workpiece 120. The compressible materials 124, 127 accommodate variations in the height of the inserted workpiece 120. The compressible materials 125, 127 also create a seal between the upper plunger 135 and the first slide plunger 115A, and also between the upper plunger 135 and the lower mold half 110.

The slideable plunger 115 and compressible materials 125, 127 are able to accommodate variations in height and width of the inserted workpiece 120 while maintaining a tight seal completely around it, thus preventing flash. The spring 156 is sufficiently strong such that the upper plunger 135 crushes1 on the compressible material 125, 127, but cannot crush the inserted workpiece 120. The compressible materials 125, 127 will compress to accommodate variations in size in the height direction of the inserted workpiece 120. For example, the compressible material 125, 127 does not need to compress as much for a taller insert than for a shorter insert.

Figure 3:
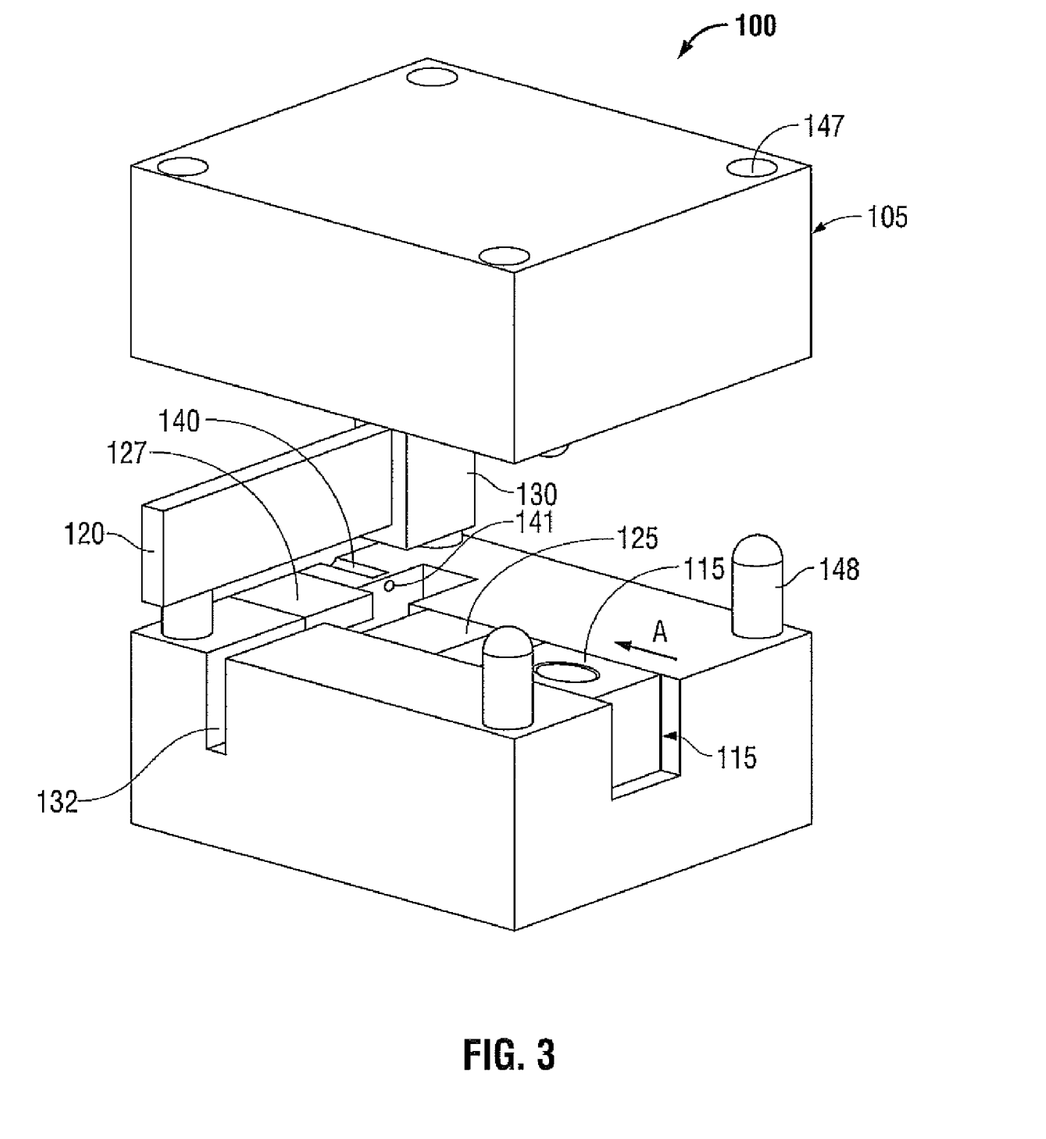
FIG. 3 is right side isometric view of the insert and mold according to an embodiment of the present disclosure.

FIG. 3 is a right side, isometric view of the insert molding device 100. In operation, it will be assumed that the press is in an open and loaded position and that the product is ready to be manufactured. After the insert 120 is placed into the cavity 132, the upper half 105 is lowered to mate with the lower mold half 110 in a closed position. Hold pins 148 on the lower mold half 110 are inserted into receiving holes 147 of the tipper mold half 105 as the upper mold half 105 is lowered. As the upper mold half 105 is lowered, the cam pin 155 inserts into the opening 180 causing the slideable plunger 115 to slide towards the insert (as shown with an arrow in direction "A") to provide a horizontal force to secure the inserted workpiece 120 in place into the lower mold half 110. Once the upper mold half 105 fully closes with the lower mold half 110, molten resin is then introduced into the molding chamber 134. The molten resin enters the cavity 132 via gate 140 and runner system 142 after reaching an interior of the die 105, 110. After the formation of a casting/molding that contains the insert is completed, the upper mold half 105 is separated from the lower mold half 110. Accordingly, the final inserted workpiece may be removed by injector pins (not shown).

Figure 4:
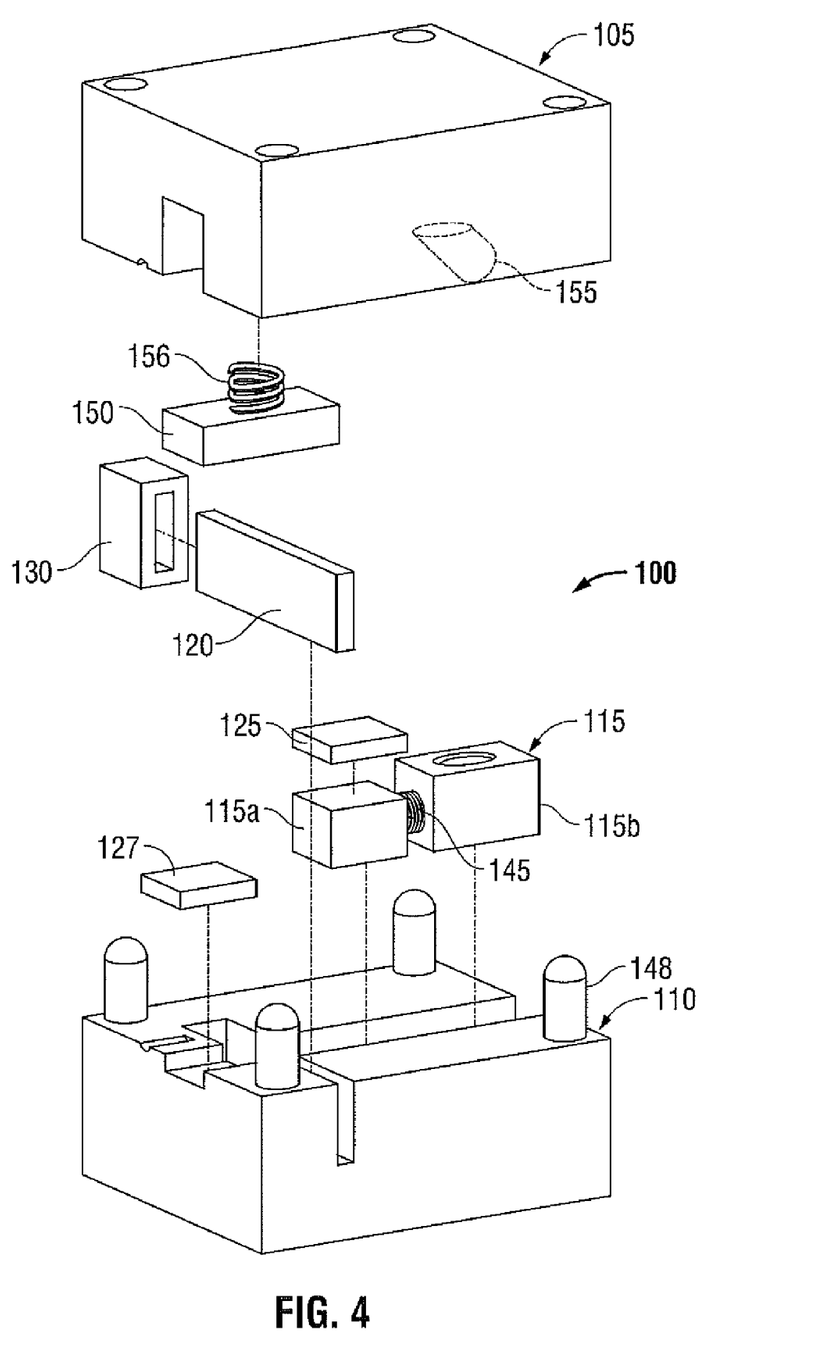
FIG. 4 is an exploded view of the insert and mold according to an embodiment of the present disclosure.

FIG. 4 is an exploded view of the insert 120 and molding device 100. The upper mold half 105 includes an upper plunger 150. Another spring 156 is interposed between a surface of the upper plunger 150 and a mating surface of the upper mold half 105. The spring 156 counter acts a force in response to the mold halves 105, 110 in a mating position such that the spring 156 sufficiently compresses the compressible material 127 which, in turn, compresses the inserted workpiece 120 to form a flash barrier along the molding chamber. Further, the upper mold half 105 via the spring 156 compresses the inserted workpiece 120 to form a fluid-tight seal between the compressible material 125, 127 and the inserted workpiece 120. Similarly to the compressible material 125, 127, springs 145, 156 compress differently to accommodate the various sizes of inserts. The springs 145, 156 are capable of holding a pressure to secure the insert 120 without crushing the insert 120. Further, the springs 145, 156 are capable of applying sufficient pressure to compress the compressible material 125, 127 without crushing the insert 120. The compressible material 125, 127 returns to the original shape after the compression is released. The springs 145, 156 may be open coiled helical springs or Belleville springs.

Figure 5:
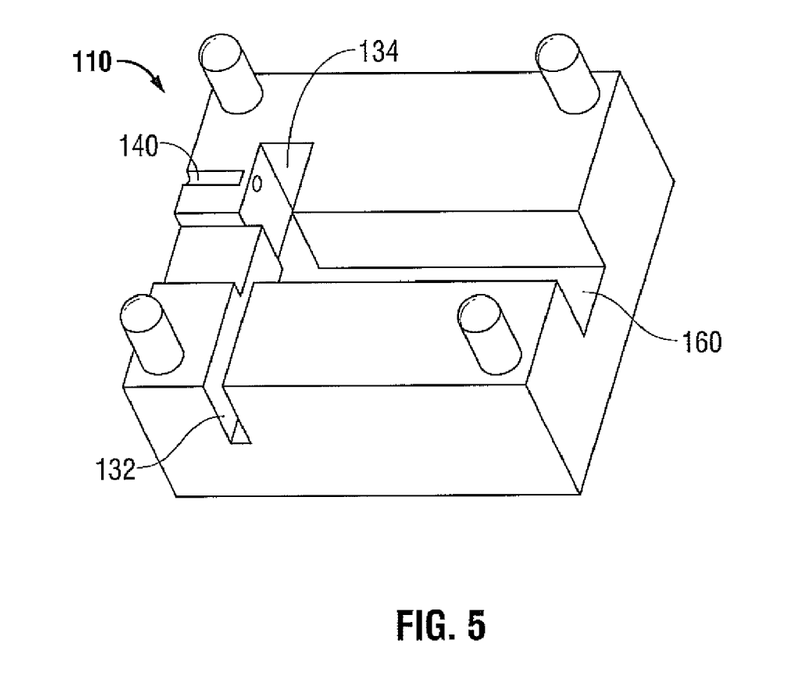
FIG. 5 is an enlarged, perspective view of a lower mold half according to an embodiment of the present disclosure.

FIG. 5 is an enlarged, perspective view of the lower mold half 110. As shown, the lower mold half 110 includes cavity 132 and molding chamber 134. The lower mold half 110 includes another cavity 160 to accommodate the slideable plunger 115.

Figure 6:
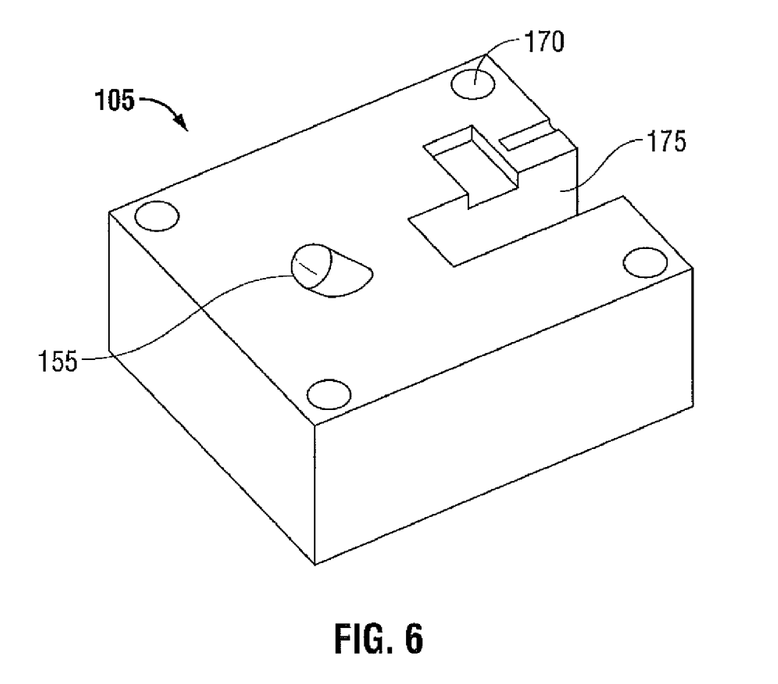
FIG. 6 is an enlarged, perspective view of an upper mold half according to an embodiment of the present disclosure.

FIG. 6 is an enlarged, perspective view of the upper mold half 105. As shown, the cam pin 155 is at an angle so that the cam pin 155 can slide smoothly into the opening 180 of the slideable plunger 115, which causes the slideable plunger 115 to move.

Figure 7:
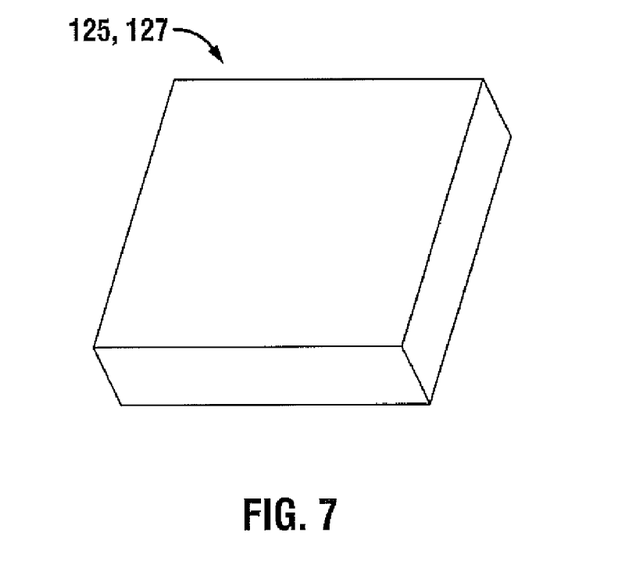
FIG. 7 is an enlarged, perspective view of a compressible material according to an embodiment of the present disclosure.

FIG. 7 is an enlarged, perspective view of a compressible material 125, 127. The compressible material 125, 127 may be made of a thermoset polymer, polypropylene or an elastomer. One skilled in the art will recognize other types of compressible material. The dimensions of the compressible material may be such that the largest inserted workpiece gets a good shutoff, while the compressible material will crush more to accommodate smaller inserts. The compressible material coupled with the springs 145, 156 provides a flash barrier and a tight seal for the insert 120 and overmold 130. The seal created by the apparatus of the present disclosure provides outstanding performance in use as well as economy of manufacture, and the process provides flash free parts that can be made economically at relatively reduced cost while maintaining high quality control. The finished products are removed from the mold without the requirement of subsequent operations being performed.

Figure 8:
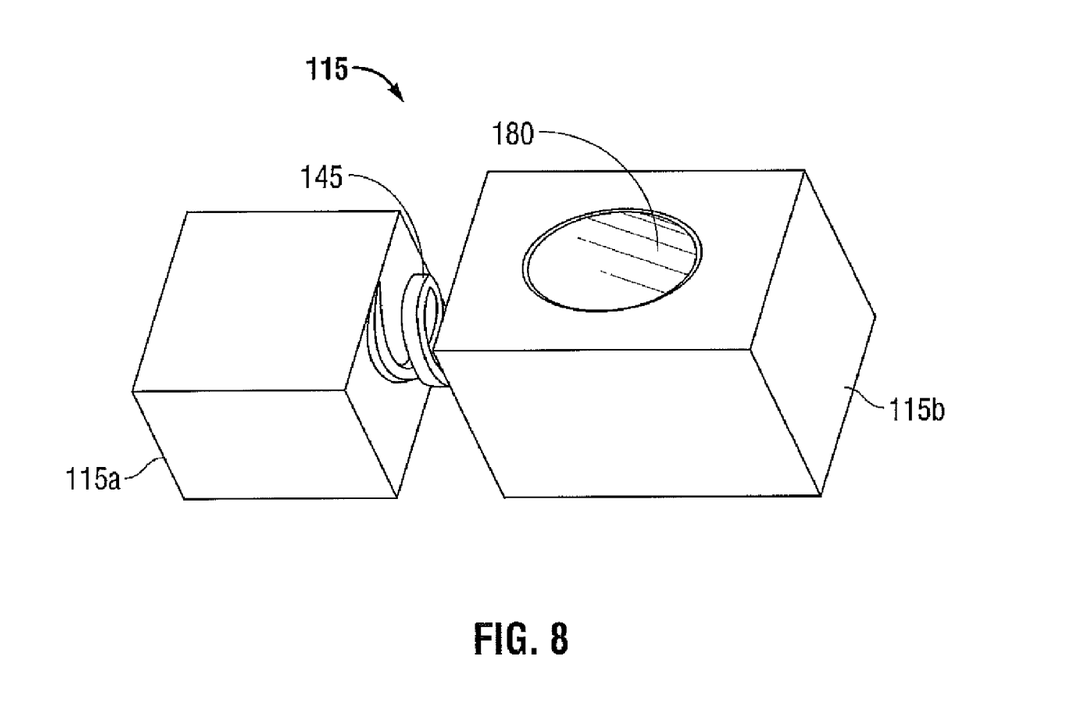
FIG. 8 is an enlarged, perspective view of a slide plunger according to an embodiment of the present disclosure.

FIG. 8 is an enlarged, perspective view of the slideable plunger 115. The slideable plunger 115 includes a first and second slide plunger 115A, 115B A spring 145 is interposed between the first and second slide plunger 115A, 115B.

Figure 9:
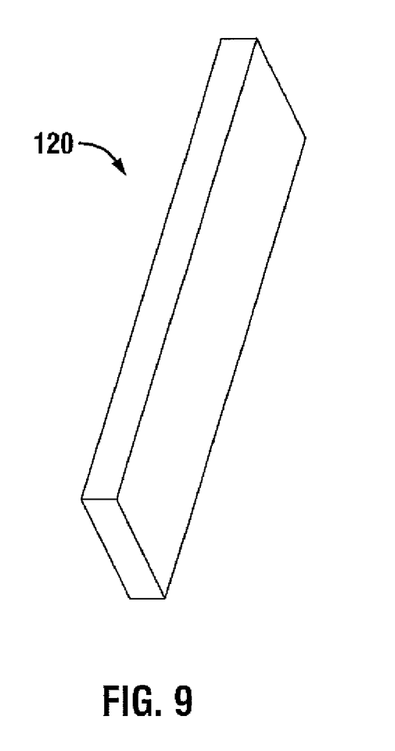
FIG. 9 is an enlarged, perspective view of an insert prior to being molded according to an embodiment of the present disclosure.

FIG. 9 is an enlarged, perspective view of the inserted workpiece 120 prior to being molded. The insert 120 may be made of a metal alloy such as stainless steel.

Figure 10:
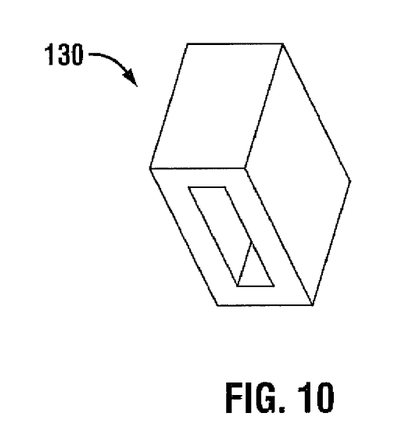
FIG. 10 is an enlarged, perspective view of a molded piece without the insert according to an embodiment of the present disclosure.
Figure 11:
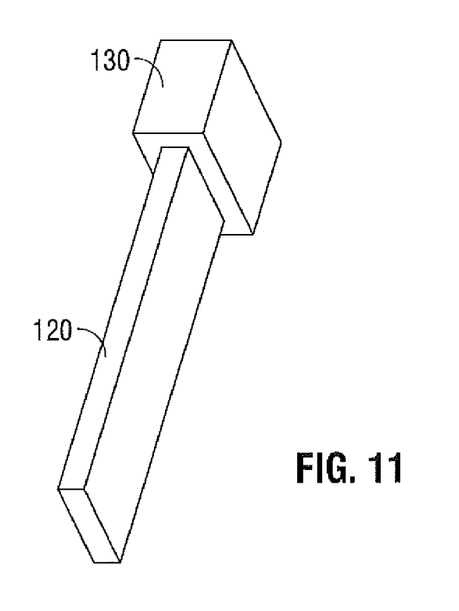
FIG. 11 is an enlarged, perspective view of a molded insert according to an embodiment of the present disclosure.
Figure 12:
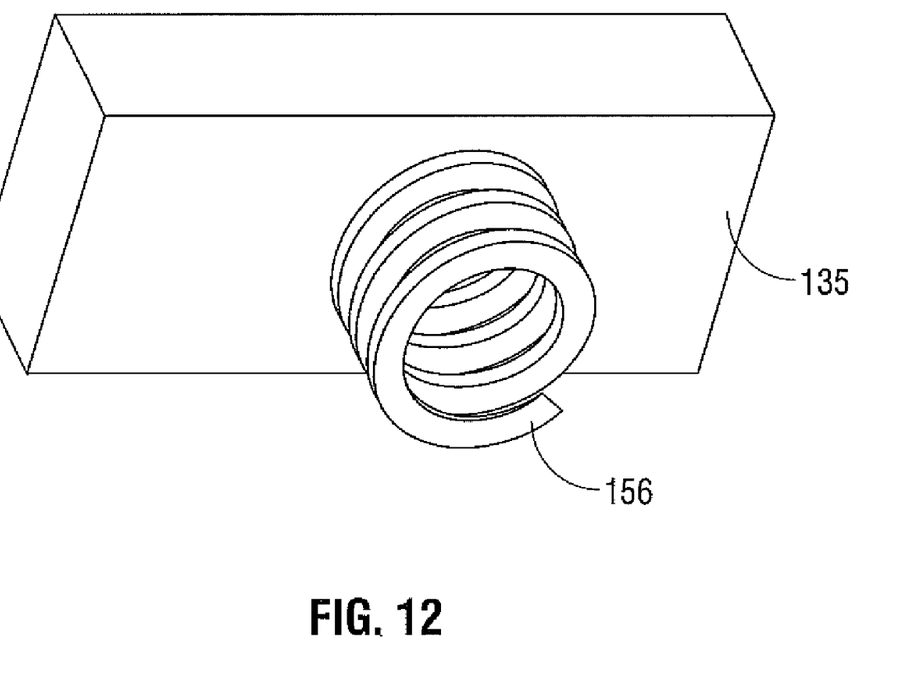
FIG. 12 is an enlarged, perspective view of an tipper plunger according to an embodiment of the present disclosure.

FIG. 10 is an enlarged, perspective view of the molded piece 130 without the insert 120. FIG. 11 is an enlarged, perspective view of the molded insert 120, 130 after the insert molding process. FIG. 12 is an enlarged, perspective view of the upper plunger 135 that includes a spring 156.

While several embodiments of the disclosure have been shown in the drawings and/or discussed herein, it is not intended that the disclosure be limited thereto as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. An insert molding device, comprising:
   an upper mold half having a first mating surface;
   a lower mold half having a second mating surface, the first and second mating surfaces configured to matingly couple to define a cavity therebetween, the cavity configured to receive an inserted workpiece therein, a portion of the cavity enlarged to provide a molding chamber surrounding a region of the inserted workpiece;
   at least one compressible material coupled to the second mating surface of the lower mold half;
   an injection gate having an outlet defined therein opening into the molding chamber, the injection gate configured to deliver molten plastic under pressure into the molding chamber for molding the molten plastic on the inserted workpiece; and
   wherein the upper mold half includes:
      an upper plunger; and
      at least one spring coupled between the upper plunger and the upper mold half, the at least one spring configured to bias the upper plunger against the inserted workpiece and the compressible material when the first and second mating surfaces are matingly coupled to form at least a first portion of a flash barrier along the molding chamber.

2. The insert molding device of claim 1, wherein the lower mold half includes:
   a first slide plunger, a second slide plunger, and a spring disposed therebetween, the first and second slide plungers configured to slide along the lower mold half,
   wherein the first slide plunger includes a third mating surface configured to matingly couple with the first mating surface, the first slide plunger including a second compressible material coupled to the third mating surface and engagable with the upper plunger to form at least a second portion of the flash barrier along the molding chamber when the first mating surface and the third mating surface are coupled.

3. The insert molding device of claim 2, wherein the upper mold half includes a cam pin, the cam pin configured to be inserted into an opening of the second slide plunger to cause the first and second slide plungers to slide towards the inserted workpiece as the upper and lower mold halves matingly couple.

4. The insert molding device of claim 2, wherein the first and second mating surfaces define a first plane and the first and second plungers are configured to slide parallel to the first plane in response to the upper and lower mold halves moving between a non-mating position and the mating position.

5. The insert molding device of claim 2, wherein the at least one spring of the upper mold half and the spring of the lower mold half are open coiled helical springs or Belleville springs.

6. The insert molding device of claim 1, wherein the upper mold half is configured to form the flash barrier and a fluid-tight seal with the at least one compressible material of the lower mold half and the inserted workpiece.

7. The insert molding device of claim 1, wherein the at least one compressible material is a thermoset polymer, polypropylene or an elastomer.

8. The insert molding device of claim 1, wherein the workpiece is a jaw member of an end effector assembly.

9. The insert molding device of claim 1, wherein the upper mold half is configured to form the flash barrier without crushing the inserted workpiece.

\* \* \* \* \*